Nov. 9, 1971  W. H. HAMILTON ET AL  3,618,369
APPARATUS AND METHOD FOR TESTING ROCK
Filed April 21, 1970

INVENTORS
HOWARD J. HANDEWITH, JR.
WILLIAM H. HAMILTON

BY
Bernard J. Murphy
AGENT

# United States Patent Office 3,618,369
Patented Nov. 9, 1971

3,618,369
APPARATUS AND METHOD FOR TESTING ROCK
William H. Hamilton and Howard J. Handewith, Jr.,
Seattle, Wash., assignors to Lawrence Manufacturing
Company, Seattle, Wash.
Filed Apr. 21, 1970, Ser. No. 30,373
Int. Cl. G01n 3/42
U.S. Cl. 73—81
15 Claims

ABSTRACT OF THE DISCLOSURE

A method for testing rock for its resistance to boring in which a specimen of the rock is fixed on a bearing surface and is stressed with a tool until the specimen exhibits deformation after which the amount of the permanent deformation is measured as is the force which effected the deformation. The invention comprises applying a predetermined force at a predetermined rate or varying rate to the specimen and measuring the resultant arbitrary deformation, as well as applying an increasing force at a predetermined rate or varying rate to the specimen until a predetermined deformation is realized. The invention also comprises novel apparatus for testing rock to determine its resistance to boring with which apparatus can be practiced the inventive methods.

---

In the prior art different methods are already known for testing rock for its resistance to boring. Some of the known methods are extremely simple and, therefore, usually unreliable. As, for example, there is the method in which one who is alleged to be experienced will scratch a rock with a pen knife and make a speculative determination as to its hardness and boring resistance.

There are complex and expensive methods of testing rock which are nonetheless of questionable reliability or are not directly applicable to testing rock for boring with some types of rocks cutters—as, say, a rotary rock cutter used on a tunneling machine. It is an object of this invention, then, to teach a rock testing method, for determining the boring resistance of a rock, which is both reliable and simple. A particular object of this invention is to teach a rock testing method in which a specimen of the rock is fixed on a bearing surface and the specimen is stressed with a tool until the specimen shows a deformation, the method including the measurement of the amount of permanent deformation and a measurement of the force used to effect the deformation.

Another object of this invention is to teach a method of plotting the afore-mentioned measurements of specimen deformation and stressing force on a chart, averaging the plotted projections, and expressing the averaged, linearly-defined or curvilinear-defined measurement as a "penetration index" for rock of which the specimen is a sample.

It is an object of this invention to teach a method of the types noted for testing a rock in which a predetermined force is applied to stress the rock to some arbitrary deformation.

Another object of this invention is to teach a rock testing method in which an increasing force is applied to stress the rock until a predetermined deformation occurs.

A further object of this invention is to teach an apparatus for testing rock to determine its boring resistance, with which apparatus the novel methods can be practiced, comprising means for holding a specimen of rock; means for stressing said specimen to cause deformation thereof; and means for measuring both the deformation and the force which caused it to occur.

A feature of this invention comprises an use of a cylindrical holder for the specimen which holder confines a potting compound, a fluid powered ram for stressing the specimen, a dial indicator or strain measuring device for measuring the deformation of the specimen, and a fluid-pressure gauge for measuring the stress or the force which causes the deformation.

Further objects and features of this invention will become more apparent by reference to the following description taken in conjunction with the accompanying figures in which.

Figure 1:
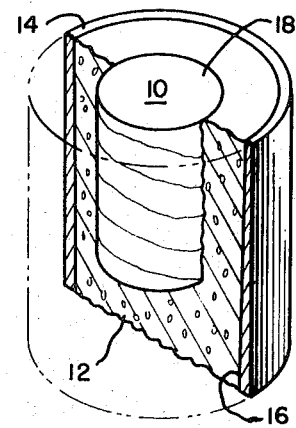
FIG. 1 is a vertical, cross-sectional view of the cylindrical holder for the specimen showing the potting compound which fixes the specimen in place for stressing.

As shown in FIG. 1 a specimen or sample of rock 10 is imbedded in a potting compound 12 within a steel cylinder 14. The cylinder has a tapered inside diameter 16 to insure against axial movement of the specimen or the potting compound under stress. In experiments conducted with this method, the potting compound: Hydrostone, a high-strength cement product of the United States Gypsum Company was used. However, other potting compounds of equal quality can be used.

The potting compound 12 causes a slight stressing of the rock specimen 10 when the compound has "set." This stressing simulates the same kind of tension which the rock would normally experience in situ.

A likely sample of rock is first cut, with a diamond saw, to define a flat surface 18 thereon. The saw-cut surface 18 is then placed down on a flat bearing surface, and the cylinder 14 is placed over it. Next, the potting compound 12 is poured into the cylinder and, after drying, the compound and the cylinder are ground flush. Thereafter, with the potting compound thoroughly dried, the cylinder 14 is inverted, and the specimen 10 has surface 18 presented for stressing.

Figure 2:
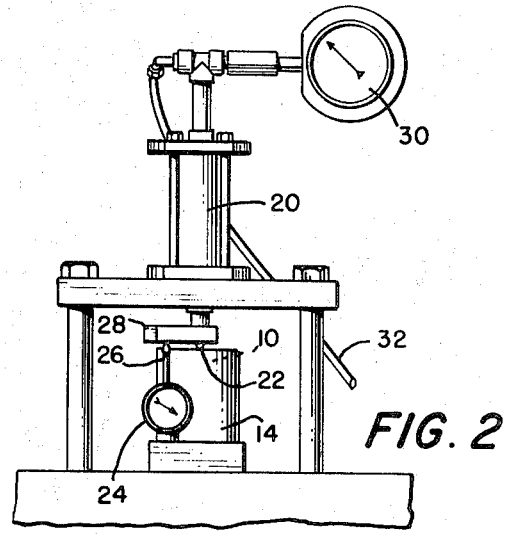
FIG. 2 is a diagrammatic sketch of a testing set-up for testing rock boring resistance in accordance with the methodology taught by the invention.

As shown in FIG. 2, the rock specimen 10 is set beneath a hydraulic ram 20 which carries a carbide button bit 22 in the working end thereof. A dial indicator 24 is mounted on a base adjacent to the cylinder 14, and has an extending member 26 coupled to the ram 20 to track its movement. The coupling is effected through the termination of member 26 against a test head 28. The bit 22 projects from the test head 28 for address thereof to the specimen 10. Fluid supplied to the hydraulic ram 20 is measured by the pressure gauge 30 connected with a hydraulic fluid supply line 32.

In the operation, the ram 20 is actuated and the button bit 22 is pushed into the rock specimen surface 18 until a deformation occurs, according to one mode of the novel method. As the button bit 22 moves into the rock surface 18 the dial indicator 24, through a resulting translation of member 26, signals the amount of deformation occurring. Meanwhile, the pressure gauge 30 signifies the amount of fluid-pressure or stressing force which caused the indicated amount of deformation. In lieu of dial indicator 24, any acceptable strain-measuring device can be employed.

According to one mode or teaching of the method, predetermined deformations are established and fluid pressure is supplied to the ram 20 until such deformations are exhibited.

In experiments run on this method it has been found practical to establish progressive, accumulative permanent deformations, i.e., progressive permanent deformations of two-hundredths of an inch, for example. Accordingly, definitively to correctly determine the boring resistance of a specimen of rock it is the instruction of this inventive disclosure to practice the following procedure.

Effect the first two hundredths of an inch of apparent deformation in the specimen 10 and measure the force which brought this about. Then plot this information on a bi-axial chart. For instance, the penetration, that is the first two hundredths of an inch, shall be set out from the abscissa of the chart and the force or pressure which realized this penetration is to be plotted from the ordinate of the chart. Then a second penetration is made into the rock specimen 10 to the depth of four hundredths of an inch. Again, this is plotted from the abscissa of the chart. Accordingly, successive penetration of the rock specimen 10 to depths of six hundredths, eight hundredths, and ten hundredths of an inch are plotted on the chart, together with the fluid-force pressures therefor. Finally, the plots are averaged or interpolated, and a line is drawn along the averaged plot inscriptions. This line represents a "penetration index" for rock of which the specimen 10 is a sample. This index can be expressed as the equation:

$$\delta_i = \frac{\frac{F_1}{D_1} + \frac{F_2}{D_2} + \frac{F_3}{D_3} + \frac{F_4}{D_4} + \cdots + \frac{F_n}{D_n}}{n}$$

where $\delta_i$ = the "penetration index" expressed in pounds/inch;
$F_1$ through $F_n$ = the stressing forces deployed to effect the successive permanent deformations expressed in pounds;
$D_1$ through $D_n$ = the successive deformations, expressed in inches; and
$n$ = the number of data points, or the number of successive permanent deformations effected.

Figures 3A, 3B, 3C:
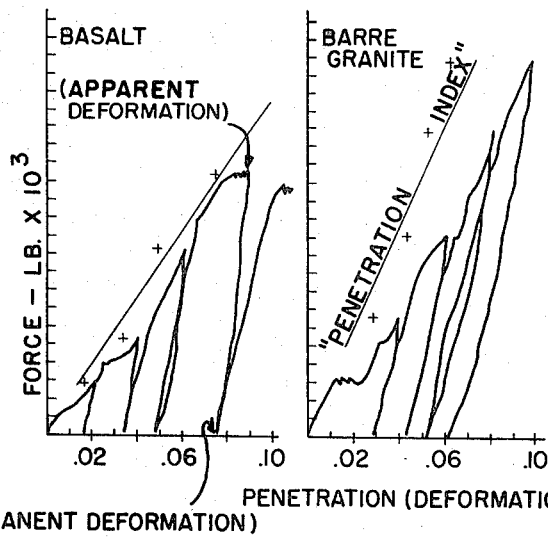
FIGS. 3A, 3B and 3C are charts resulting from tests in which three types of rock specimens were stressed and plotted.

Plots actually made on three different types of rock samples are shown in FIGS. 3A, 3B, and 3C. FIG. 3A represents the plot made of the rock identified as Basalt. The chart shown in 3B is that of the hardness of the rock identified as Barre Granite. Finally the chart shown in 3C is that plot for the hardness of Dolomitic Limestone. On the abscissa of each chart are indicated increments of penetration in hundredths of an inch; on the ordinate of the charts are indicated pressure levels of force for effecting rock specimen penetrations.

The most reliable information proceeding from the use of the apparatus taught herein, and the methodology set forth, is that defined as the force-to permanent deformation-ratio. Therefor, the equation priorly presented should be understood to represent the values $D_1$ through $D_n$, as measurements of permanent deformation. Illustratively, FIG. 3B is a plot of a test made on a specimen of Barre Granite. Four successive force-penetrations were made in this specimen for an apparent penetration or deformation of 0.09 inch with 15,900 pounds of force. The permanent deformation of this specimen, however, measured by relieving the pressure on the ram 20 (FIG. 2) was 0.061 inch. As a practical matter, what this novelty teaches the field, is that every time a given rock cutter—a rotary rock cutter, let us say—traverses a given point on a rock face in a tunnel bore, with a fixed load, the tunneling machine will advance a distance which is equivalent to the design load, per cutter edge, divided by the "penetration index" ($\delta_i$).

In its most practical application, then, this invention teaches methods of testing rock specimens for resistance to boring comprising the step of relieving the applied forces to read the permanent deformations formed in the specimens.

Figure 4:
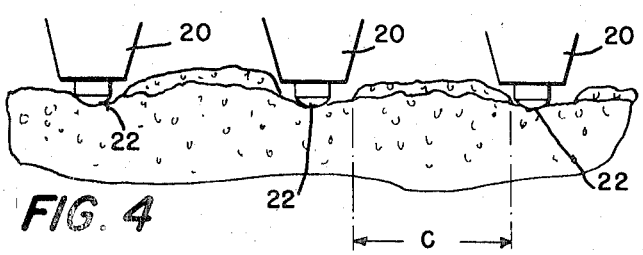
FIG. 4 is a pictorial sketch of the working end of hydraulic rams having rock cutter button bits extending therefrom used to determine an optimum spacing for cutters in rock of which the illustrated specimen is a sample.

The efficiency of rock boring is best achieved when the chip sizes occurring between adjacent cutters are equal to the distance between such adjacent cutters. If the spacing between cutters is excessive the cutter bit failures will increase. So also, if the space between the cutters is too narrow, the expenditure of cutter energy will be uneconomical. Accordingly, it is expedient to use the teaching of this invention to determine an optimum cutter spacing for different types of rock specimens. In this aspect of the invention a plurality of hydraulic rams 20 or load applying device with cutter bits 22 mounted thereon are addressed a specimen 10 of the rock, the cutter bits 22 having an arbitrary spacing therebetween; see FIG. 4. The rams 20 are used to force the bits 22 into the rock specimen 10 until there occurs failure and chipping of the rock specimen. If the chip size measurement C is less than the distance between adjacent cutters, the cutter spacing should be closed up until the chip measurement C just corresponds with the spacing. So also, of course, if the C dimension measurement is equal to the cutter spacing it is advisable to move the bits 22 further apart and repeatedly test the rock until that spacing at which chip dimension C can no longer bridge the space between the rams 20, to determine an optimum arangement, by then slightly closing up the bits 22 to the greatest, realizable C dimension.

While we have described our invention in conjunction with a specific embodiment of apparatus, and particular methodology of its practice, it is to be clearly understood that this is done only by way of example and not as a limitation to the scope of the invention as set forth in the objects thereof and the appended claims.

We claim:
1. A method for testing rock for its resistance to boring, comprising the steps of:
    fixing a specimen of rock on a bearing surface;
    stressing said specimen with a tool until said specimen exhibits deformation;
    measuring the amount of permanent deformation; and
    measuring the force used to effect said deformation.
2. A rock testing method, according to claim 1, wherein the stressing step comprises at least initially stressing said specimen, with said tool, with an increasing force until said specimen exhibits deformation to a given, predetermined measurement.
3. A rock testing method, according to claim 2, further including the steps of:
    sequentially and repetitively stressing said specimen, with said tool and with an increasing force, until said specimen exhibits sequential deformations of incremental measurements in which each of said incremental measurements correspond to said given measurement;
    measuring the forces used to effect each of such incremental measurements;
    plotting the measured forces which effect said given and said incremental measurements on one axis of a bi-axial chart; and
    plotting said given and said incremental measurements on the other axis of said chart.
4. A rock-testing method, according to claim 3, further including the step of inscribing a line on said chart, on an axis transverse to said one and other axes, which averages or interpolates the plotting of the measurements vis-a-vis the forces.
5. A rock-testing method, according to claim 4, further including the step of expressing the transverse axial line as a penetration index for rock of which said specimen is a sample.
6. A rock-testing method, according to claim 3, further including the steps of:
    relieving said specimen of deformation-causing force before subsequent stressing thereof; and
    measuring said deformation and said sequential deformations as static or permanent deformations.
7. A rock-testing method, according to claim 6, further including the steps of:
    inscribing a line on said chart, on an axis transverse to said one and other axes, which averages or interpolates the plotting of the measurements of said permanent deformations vis-a-vis the measured stressing forces which effected the same; and expressing the transverse axial line as a penetration index for rock of which said specimen is a sample.

8. A rock-testing method, according to claim 7, wherein:

said index-expressing step comprises defining said index as the equation:

$$\delta_i = \frac{\frac{F_1}{D_1}+\frac{F_2}{D_2}+\frac{F_3}{D_3}+\frac{F_4}{D_4}+ \cdots +\frac{F_n}{D_n}}{n}$$

$\delta_i$=the penetration index in pounds/inch,
$F_1$ through $F_n$=the stress forces, in pounds, for each sequential stressing,
$D_1$ through $D_n$=the measurements, in inches, of said permanent deformations, and
$n$=the number of stressings.

9. A rock-testing method according to claim 1, further including the step of confining said specimen in a solid material, before fixing said specimen on a bearing surface.

10. A rock-testing method, according to claim 1, further including the step of subjecting said specimen to a confining force simulative of the stressing to which it would be subject in situ, before fixing said specimen on a bearing surface.

11. A rock-testing method, according to claim 1, wherein:

said fixing step comprises setting said specimen, rigidly, in a holder, and disposing said holder on a bearing surface;

said stressing step comprises mounting said tool on the end of a fluid-powered ram, and extending said ram to force said tool into a surface of said specimen;

said deformation-measuring step comprises coupling dial indicator means between both said ram and said holder for indicating the degree of extension of said ram; and said force-measuring step comprises supplying a variable fluid supply to said ram, controlling said supply, and gauging the controlled supply to enable a sensing of the force of the controlled supply.

12. A method for testing rock for its resistance to boring to determine optimum spacing for the address of cutters thereto, comprising the steps of:

first, fixing a specimen of rock on a bearing surface;
second, initially stressing said specimen at first locations arbitrarily spaced apart on a given surface thereof, with a tool at each of said locations, until said specimen exhibits deformation and chipping;
third, examining chip sizes to determine the particular dimensions thereof which extend between said first locations;
fourth, spacing said tools further apart to other locations, when said particular dimensions correspond to the dimensional distance subsisting between said first locations, and stressing said specimen at said other locations until said specimen again exhibits deformation and chipping, examining chip sizes to determine a correspondence between said sizes and the dimensional distance subsisting between said other locations;
fifth, repeating the foregoing fourth step, until chip sizes produced by stressing of said specimen at some spaced-apart locations fail to correspond to the dimensional distance subsisting between said given locations; and then
sixth, sequentially spacing said tools closer and closer together to more proximate locations to reduce the dimensional distances therebetween, and sequentially stressing specimen at said proximate locations, until chip sizes produced by stressing of said specimen do correspond to the dimensional distance subsisting between last-used proximate locations.

13. A method for testing rock for its resistance to boring to determine optimum spacing for the address of cutters thereto, comprising the steps of:

first, fixing a specimen of rock on a bearing surface;
second, initially stressing said specimen at first locations arbitrarily spaced apart on a given surface thereof, with a tool at each of said locations, until said specimen exhibits deformation and chipping;
third, examining chip sizes to determine the particular dimensions thereof which extend between said first locations;
fourth, spacing said tools closer together to other locations, when said particular dimensions are less than the dimensional distance subsisting between said first locations, and stressing said specimen at said other locations until said specimen again exhibits deformation and chipping, examining chip sizes to determine a correspondence or disparity between said sizes and the dimensional distance subsisting between said other locations; and
fifth, repeating the foregoing fourth step, as required, until chip sizes produced by stressing of said specimen at some given spaced-apart locations do correspond to the dimensional distance subsisting between any one of said given locations.

14. An apparatus for testing rock for its resistance to boring, comprising:

means for holding a specimen of rock;
means for forcedly stressing a surface of said specimen to cause a deformation of said surface;
means engageable by said stressing means for measuring the amount of said surface deformation; and
means coupled to said stressing means for measuring the force with which said stressing means stresses said surface; and wherein
said holding means includes means for stressing said specimen with a confining force simulative of the stressing to which said specimen would be subject in situ.

15. An apparatus for testing rock for its resistance to boring, comprising:

means for holding a specimen of rock;
means for forcedly stressing a surface of said specimen to cause a deformation of said surface;
means engageable by said stressing means for measuring the amount of said surface deformation; and
means coupled to said stressing means for measuring the force with which said stressing means stresses said surface; and wherein
said holding means comprises a cylinder, said cylinder having potting compound therewithin for setting said specimen for exposure of a surface thereof at one end of said cylinder;
said stressing means comprises a fluid-powered and fluid-supplied movable ram having a tool coupled to a working end thereof for address to said surface;
said deformation-measuring means comprises a dial indicating means having a reciprocating member;
said force-measuring means comprises a fluid pressure gauge; and wherein
said cylinder has a tapered inside diameter.

References Cited

UNITED STATES PATENTS

| | | | |
|---|---|---|---|
| 1,320,748 | 11/1919 | Fisher | 73—81 |
| 2,608,857 | 9/1952 | La Torre et al. | 73—103 |
| 3,505,860 | 4/1970 | Bishop et al. | 73—94 |

JERRY W. MYRACLE, Primary Examiner

U.S. Cl. X.R.

73—89